United States Patent [19]
Bond

[11] Patent Number: 5,575,971
[45] Date of Patent: Nov. 19, 1996

[54] CIRCLE CIRCUMSCRIBER AND CUTTER OF STEEL PLATES

[76] Inventor: Jerry L. Bond, 1020 120th Ave. SE., Clara City, Minn. 56222

[21] Appl. No.: 433,683

[22] Filed: May 4, 1995

[51] Int. Cl.⁶ .................................................. B23K 7/10
[52] U.S. Cl. ................................................ 266/66; 266/70
[58] Field of Search ................................... 266/48, 54, 62, 266/66, 70

[56] References Cited

U.S. PATENT DOCUMENTS

| | | | |
|---|---|---|---|
| 2,017,430 | 10/1935 | Anderson | 266/70 |
| 2,483,229 | 9/1949 | Parker | 266/70 |
| 2,523,237 | 9/1950 | Richardson | 266/66 |
| 2,603,475 | 7/1952 | Rotsch | 266/66 |
| 2,886,305 | 5/1959 | Strahan | 266/66 |
| 3,547,424 | 12/1970 | Brown | 266/70 |
| 4,021,025 | 5/1977 | Frame | 266/70 |
| 4,173,333 | 11/1979 | Wise | 266/66 |
| 4,411,410 | 10/1983 | Summer | 266/54 |

FOREIGN PATENT DOCUMENTS

| | | | |
|---|---|---|---|
| 0263720 | 1/1989 | Germany | 266/70 |

*Primary Examiner*—Scott Kastler
*Attorney, Agent, or Firm*—Schroeder & Siegfried, P.A.

[57] ABSTRACT

A double-pivot circle-cutter including a pivot member pivotally mounted on a support arm and having a sliding beam slidably extending therethrough. The pivot member is vertically adjustable, and its axis of pivot extends through the support arm. The sliding beam carries a platform which in turn pivotally supports a holder for a cutting member adjacent one end of the platform. The axes of pivot of the pivot member and of the cutting-member holder are parallel, and the latter shifts with the sliding beam to make the distance between the axes equal to the radius of the desired circular cut.

18 Claims, 6 Drawing Sheets

CIRCLE CIRCUMSCRIBER AND CUTTER OF STEEL PLATES

BACKGROUND OF THE INVENTION

There is a definite need for a mechanical circle-cutter today, particularly in view of the advent of plasma cutters and the need for efficiency in making such cuts, as in the commercial manufacture of metal discs. The conventional method in prevalent use today is to utilize a template to aid in inscribing the desired circle upon the workpiece which is frequently of sheet steel. Making a template involves a considerable waste of time.

Another method is to establish a pivot point on the workpiece and then inscribe circle with the pivot point as the center. The use of marking the pivot point mars the surface, making the end-product less desirable, sometimes to such an extent as to require remedial welding to obviate the scar.

One additional way of making a circular cut has been to utilize a magnet as a pivot point. This procedure, however, has a distinct disadvantage in that the magnet often covers the workpiece area to be cut, which limits the size of the circle which can be cut.

The closest prior art with which I am familiar is U.S. Pat. No. 2,483,229 issued to Parker in 1949, which we developed in a patentability search. For some unknown reason, to the best of my knowledge, this circle-cutting machine is not available on the market. It would appear that, since the weight of the entire cutting structure is off-set relative to the support arm 12, the key 18 and keyway 15 will quickly wear and, as a consequence, cause the nozzle 36 of the torch to be oriented off-vertical and introduce error into the cutting operation. The keyways will fill readily with grit, requiring frequent cleaning and introducing error in the cuts.

It will also be noted that the support arm is not capable of free swinging movement since the sleeve 5 has been positioned to lock the device at a predetermined elevation, for operation of the cutter. There is a limit as to how close an operator can cut a hole, to the edge of the workpiece. In addition, material to be cut must have at least a minimum of thickness in order to be able to support the Parker cutter. Also, it is impossible to adjust the height of the cutting torch without losing your center because it requires rotation of arm 12 and shaft 3.

In addition to the above, the bushing in the pivot point will wear rapidly since grit will enter same, requiring substantial maintenance and cleaning. No ready means is provided for setting the torch so as to produce a circle having a predetermined radius. Having the main frame off-center, as in the Parker patent, makes it difficult to measure from the edge of the material to the center of the circle and causes parts to wear excessively, the torch to tip, and cut to be made at an angle. No provision is made to adjust in small increments the radius of the circle to be cut. No provision is made for supporting the handle of the torch or plasma lines or for attaching automatic turning apparatus for making the cut. Also, there is a limit as to how far the circle to be cut can be disposed from the edge of the workpiece.

U.S. Pat. No. 2,523,237 issued to Richardson shows a torch cutting tool which utilizes a punched center hole and a scribed line along which the workpiece is to be cut. A wheeled carriage 11,52 moves about the center-points 16,54 to guide the torch along the desired line.

U.S. Pat. No. 2,603,475 issued to Rotsch also utilizes a carriage which rides upon the workpiece and supports the cutting torch as it is carried around the pivot point 90.

U.S. Pat. No. 2,886,305 issued to Strahan also uses a carriage 20 which carries the torch 16 as it rides over the surface to be cut.

U.S. Pat. No. 3,547,424 issued to Brown shows a template guided circle-cutting attachment driven by gear boxes and a motor.

U.S. Pat. No. 4,021,025 issued to Frame discloses a circle-cutter which utilizes a circular platform which is attached to the plate to be cut and a cutting torch carried by, and adjustable relative to, the rotatable platform and being movable in a circular path therewith.

U.S. Pat. No. 4,173,333 issued to Wise discloses a torch guide for cutting a beveled edge, incapable of cutting a circle.

U.S. Pat. No. 4,411,410 issued to Sumner discloses a complicated apparatus for cutting openings in pipes, which use a locator 82 about which the torch 96 is rotated in response to pipe contour tracking means.

None of the above patents are constructed and operate in the manner disclosed and claimed herein.

BRIEF SUMMARY OF THE INVENTION

My circle-cutter is a portable, simple and inexpensive mechanical device by means of which circular cuts may be made from a workpiece, such as a section of sheet steel, without requiring a marring center-point and with a maximum of convenience. It includes a support arm which supports a freely rotatable pivot block, the axis of pivot of which extends through the support arm. Extending through the pivot block in sliding relation thereto is a shaft or sliding beam which supports a depending platform or base which is adjustable longitudinally of the shaft for minor adjustments. A cutting torch holder is mounted on the platform adjacent one end thereof in depending relation for free rotation about its vertical axis, which is parallel to the axis of pivot of the pivot block. Thus, the torch holder can be located farthest from the pivot block when the opposite end of the platform abuts the opposite side of the pivot block, and can be shifted to any point between that location and the axis of pivot of the pivot block. At any one of such positions it can be directed along a 360° path defined by its arc having a radius equal to the distance between the axis of pivot of the pivot block and the axis of pivot of the torch holder.

Extending laterally from the torch holder is a handle and support for plasma fuel lines by means of which such movement can be directed, to cause the cutting torch to make a circular cut in a workpiece positioned immediately below the cutting torch, that cut having a radius equal to the distance between the axis of the pivot block and the axis of the torch holder.

My invention obviates the need for a mark on the surface of the workpiece to identify the pivot point, which frequently mars the surface of the workpiece. When utilizing my invention, the pivot point is automatically selected by the positioning of the circle-cutter relative to the workpiece in directly overhead relation. All that is needed is to secure the workpiece so that it will not move relative to the circle-cutter. Another advantage is that it is possible to cut multiple holes at the same setting. Also, you can cut concentric circles at the same setting. In addition, it is less time-consuming to cut a hole of desired size when utilizing my invention. It takes only approximately thirty seconds to set up to cut a circle when using my invention, in contrast to the fifteen (15) minutes required to make a template and set up the cutting equipment known heretofore.

My circle-cutter can be set upon a piece of sheet metal and used to cut a circle at any location thereon, regardless of the size of the workpiece. The height of the cutting torch can be adjusted at any time without losing the center of the circle to be cut. The bearings are sealed to preclude the entrance of grit and attendant wear, so that maintenance requirements are minimal. It has a built-in measuring system for setting the torch at exactly the right location to cut a circle of prescribed radius. The supports for the cutting mechanism are centered relative to the frame, for good balance. Means for micro-adjustment is provided to insure that the cut will have the exact desired radius. A motor assembly can be mounted on my circle-cutter to provide automatic turning, and a cut can be accomplished at any desired location upon a workpiece of any size. The torch can be installed in the torch-holder with a minimum of effort and maximum of accuracy in the cutting operation.

My circle-cutting device is much easier to use. A user can cut an entire circle while standing at one location, in contrast to earlier devices with which it is necessary to walk around the cutting equipment in order to complete the cut. My above device produces a substantial labor-saving, since it saves 80%–90% in labor over earlier cutting devices and is simple to operate. There is also substantially less waste of material when using my circle-cutter. It is particularly adaptable to custom fabrication and manufacturing, requires minimum maintenance, and can be power driven.

BRIEF DESCRIPTION OF THE DRAWINGS

These and other objects and advantages of the invention will more fully appear from the following description, made in connection with the accompanying drawings, wherein like reference characters refer to the same or similar parts throughout the several views, and in which.

DETAILED DESCRIPTION OF THE INVENTION

The preferred embodiment of my invention, as shown in FIGS. 1–6, is comprised of a frame F having a U-shaped base 10 and a pair of upstanding supports 11 and 12 spaced along the bottom of the base 10. At the upper end of the two supports 11,12, there is a horizontal panel 13 which extends laterally from the two supports and terminates in an arcuately shaped edge 14. A suitable brace member such as brace 15, is secured to the underside of the panel 13 and to the upper end of each of the supports 11 and 12.

Figure 6:
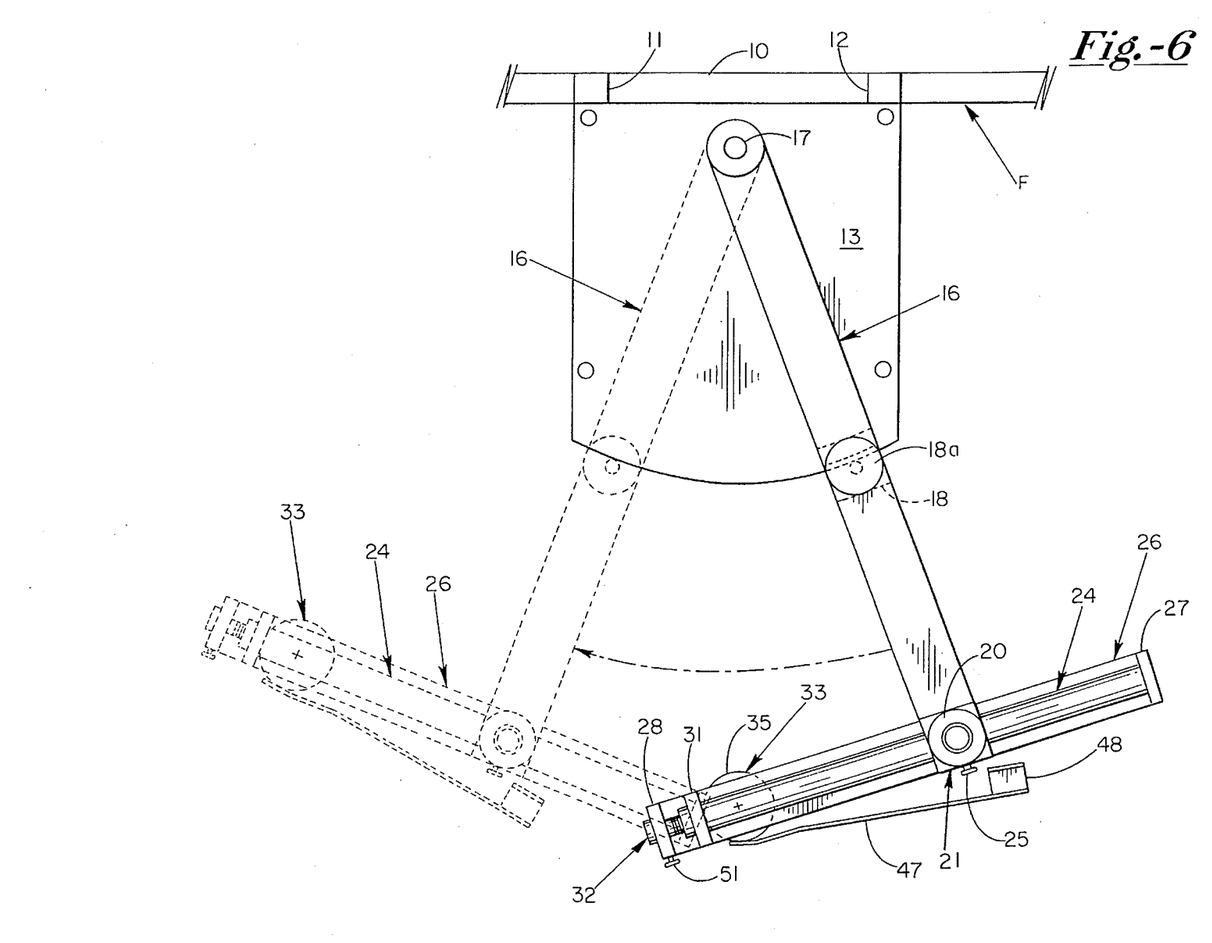
FIG. 6 is a top plan view of my above invention, showing the support arm and sliding beam support in alternative positions relative to the vertical axis of pivot of the support arm.

Pivotally mounted upon the panel 13 at the medial portions thereof and adjacent the rear end of the panel 13, which is connected to the two supports 11 and 12, is an elongated support arm 16. As shown in the drawings, support arm 16 is free to pivot about the axis of the pivotal mounting 17 within a sealed bearing provided for that purpose. A clamp member 18 is carried by the support arm 16 at the edge 14 and moves with the support arm 16 along that edge. When the clamp 18 is tightened by tightening the knurled knob 18a, the position of the support arm 16 becomes fixed relative to the panel 13. When the knob 19 is loosened, the panel 16 is free to swing between the side edges of the panel 13 to any desired out-of-way position, as shown in FIG. 6.

The outer end of the support arm 16 is tapped to threadedly receive a threaded height-adjusting rod 19, the height of which can be adjusted by turning the knob 20 which is fixedly connected thereto. As shown, the threaded height-adjusting rod 19 extends through the outer end of the internally threaded support arm 16 and has a pivot block 21 pivotally mounted on its lower end for free pivotal movement therearound, by means of suitable sealed bearings 22 which are carried by the upper end portion of the pivot block 21. The lower end of the pivot block 21 has a transverse bore as shown at the numeral 23 to accommodate a sliding shaft or beam 24. The position of the sliding beam 24 relative to the pivot block 21 is secured by means of a thumb screw 25.

Carried by the sliding beam 24 is a rectangular bar 26 which has a pair of upstanding rectangular supports 27 and 28 at its opposite end portions. Cap screws, such as indicated by the numerals 29 and 30, extend through the bar 26 upwardly into the supports 27 and 28, respectively, to fixedly secure the same to the bar 26. A third upstanding support 31 is mounted on the bar 26 in a similar fashion and in spaced relation to support 28.

Each of the supports 27 and 31 has an aligned transverse bore which accommodates the sliding beam 24 for relative sliding motion of the beam 24 therethrough. Thus, when the thumb screw 25 is released, the sliding beam 24 is free to slide longitudinally in either of its longitudinal directions, relative to the pivot block 21 and to carry the bar 26 and supports 27, 28 and 31 therewith, while doing so. Support 27 is secured to beam 24 via Allen set screw 27a, and support 31 is secured to said beam via Allen set screw 31a.

Mounted in the support 28 for rotation about its longitudinal axis is a micro-adjustment member 32. This adjustment member is in the form of a shoulder screw and, therefore, has a snap-ring groove machined in it to accommodate a snap ring on the inside of the support 28, to thereby secure the adjustment member thereto for free rotation about its longitudinal axis. The adjacent end of the sliding beam 24 is tapped and the inner end of the adjustment member 32 is threaded thereinto. Allen set screws 27a and 31a must be loosened to enable beam 24 to shift relative to supports 27 and 31, respectively, thereafter. Upon rotation of the adjustment member 32 in either direction, the beam or shaft 24 is caused to shift longitudinally relative to the bar 26 and through the supports 27 and 31. It will be seen that the horizontal bar 26 and the sliding beam 24 constitute a mounting base for the torch holder 33, so that they all move with the beam 24.

Figure 1:
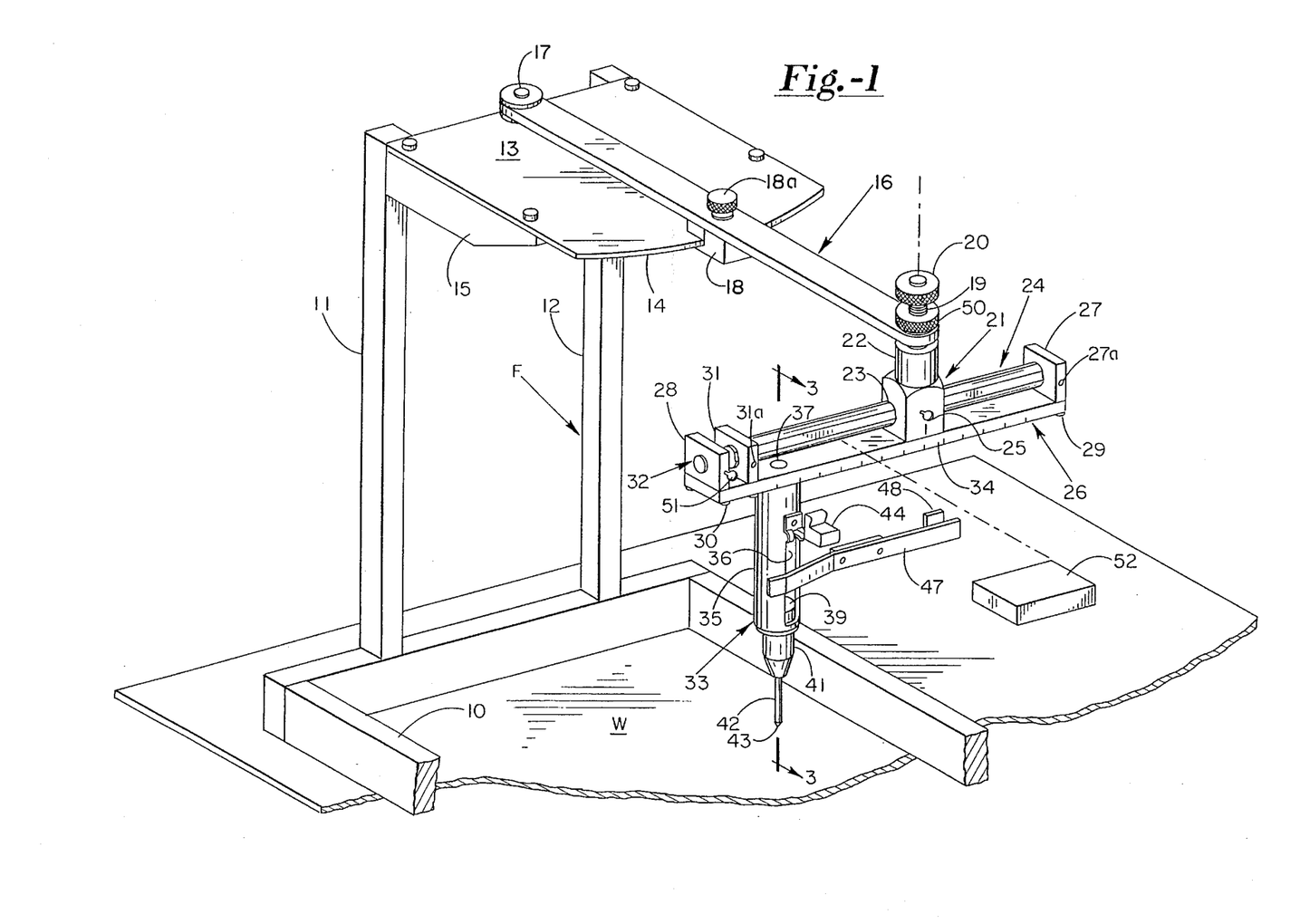
FIG. 1 is a perspective view of the preferred embodiment of my invention.
Figure 2:
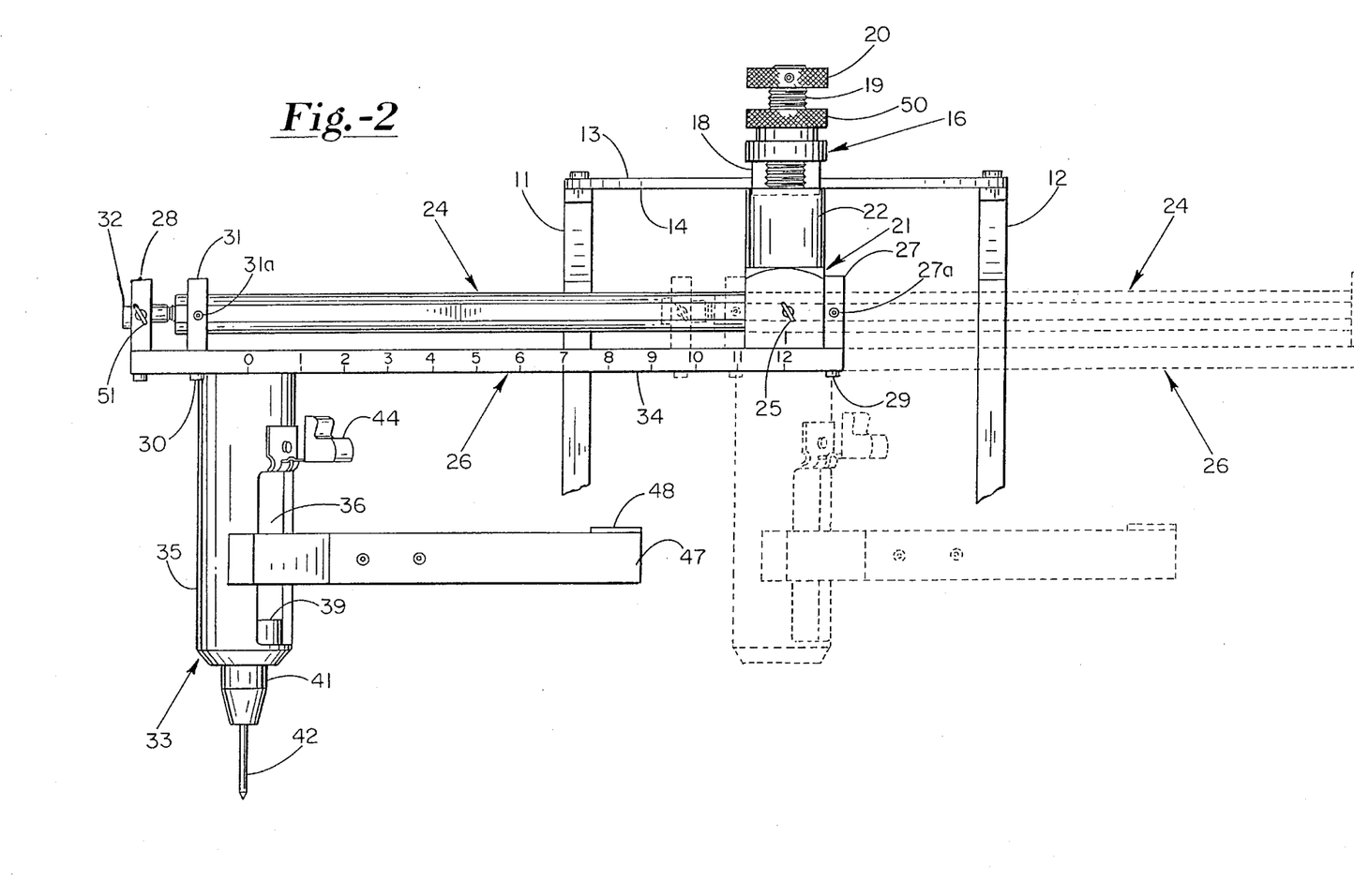
FIG. 2 is a fragmentary front end elevational view on an enlarged scale of my above circle-cutter, with the sliding beam and cutting torch holder swung to a transverse position.

As best shown in FIG. 1, the mounting bar 26 has a scale 34 attached to its side edge and showing the radius of a circle which will be cut in accordance with the numeral which is disposed immediately below the pivot block 21 when in position directly opposite the axis of pivot of that pivot member. Thus, when the numeral 7 is positioned directly opposite the axis of pivot of the pivot block 21, the device will cut a circle having a 7-inch radius. The scale is located so that, when the support 31 abuts against the side of the pivot block 21, the zero figure on the scale will be disposed directly opposite the vertical axis of the pivot block 21. In that same position, the axis of pivot of the torch holder 33 will be aligned with the axis of pivot of pivot block 21 or, in other words, at zero position, as shown in broken lines in FIG. 2.

The torch holder 33 is comprised of an elongated member 35 which is tubular in its lower portions and has a window 36 formed in its lower walls. The upper portion of the tubular member and has its upper end 37 rotatably mounted on and supported by the bar 26. Suitable bearings (not shown) are provided to mount the upper end 37 thereof in the bar 26 so that it will rotate freely about a vertical axis, which is parallel to the axis of pivot of the pivot block 21.

Figure 3:
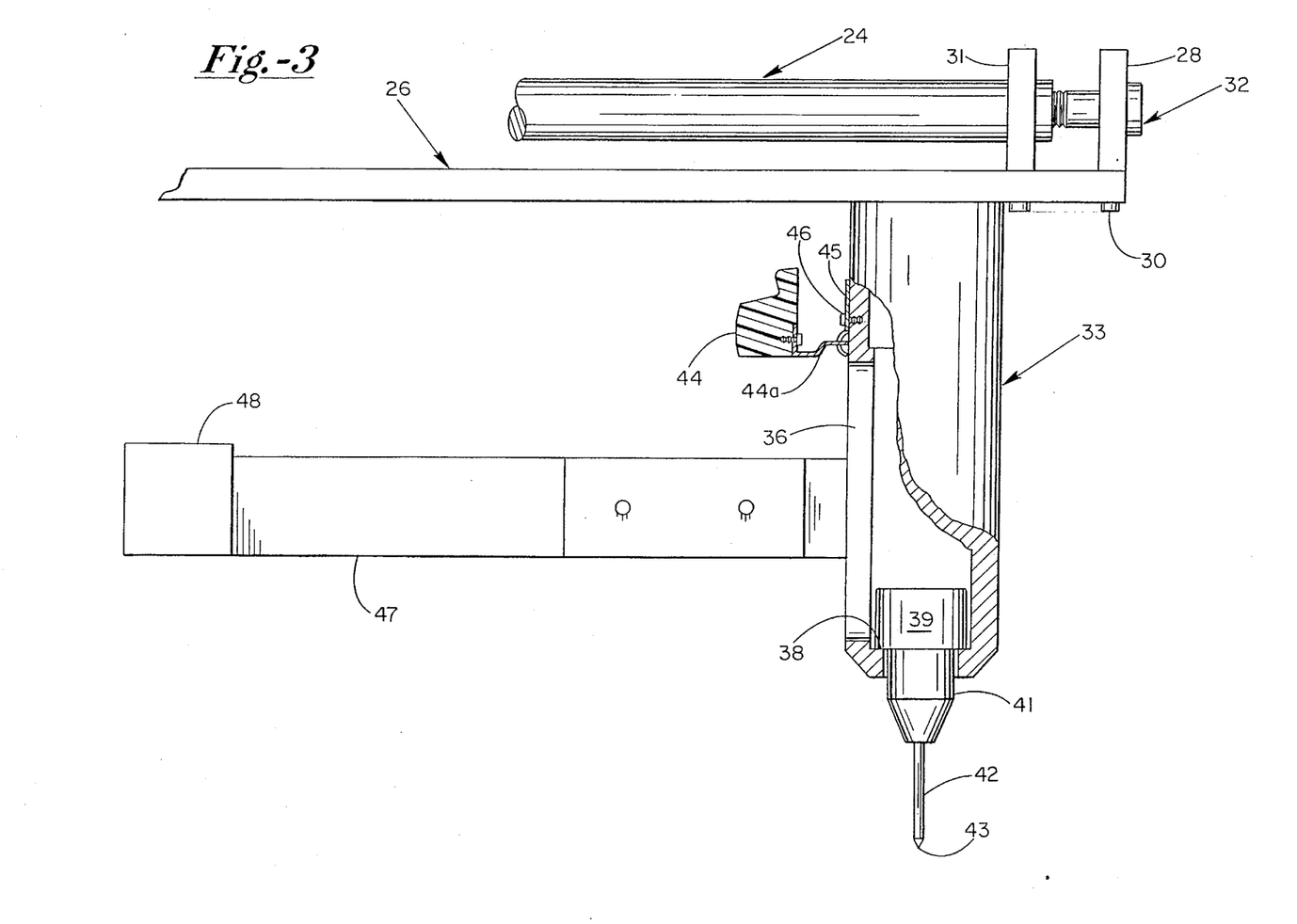
FIG. 3 is a fragmentary side elevational view, on a similar scale, of the torch holder of my above invention, shown partly in elevation and partly in vertical section.
Figure 4:
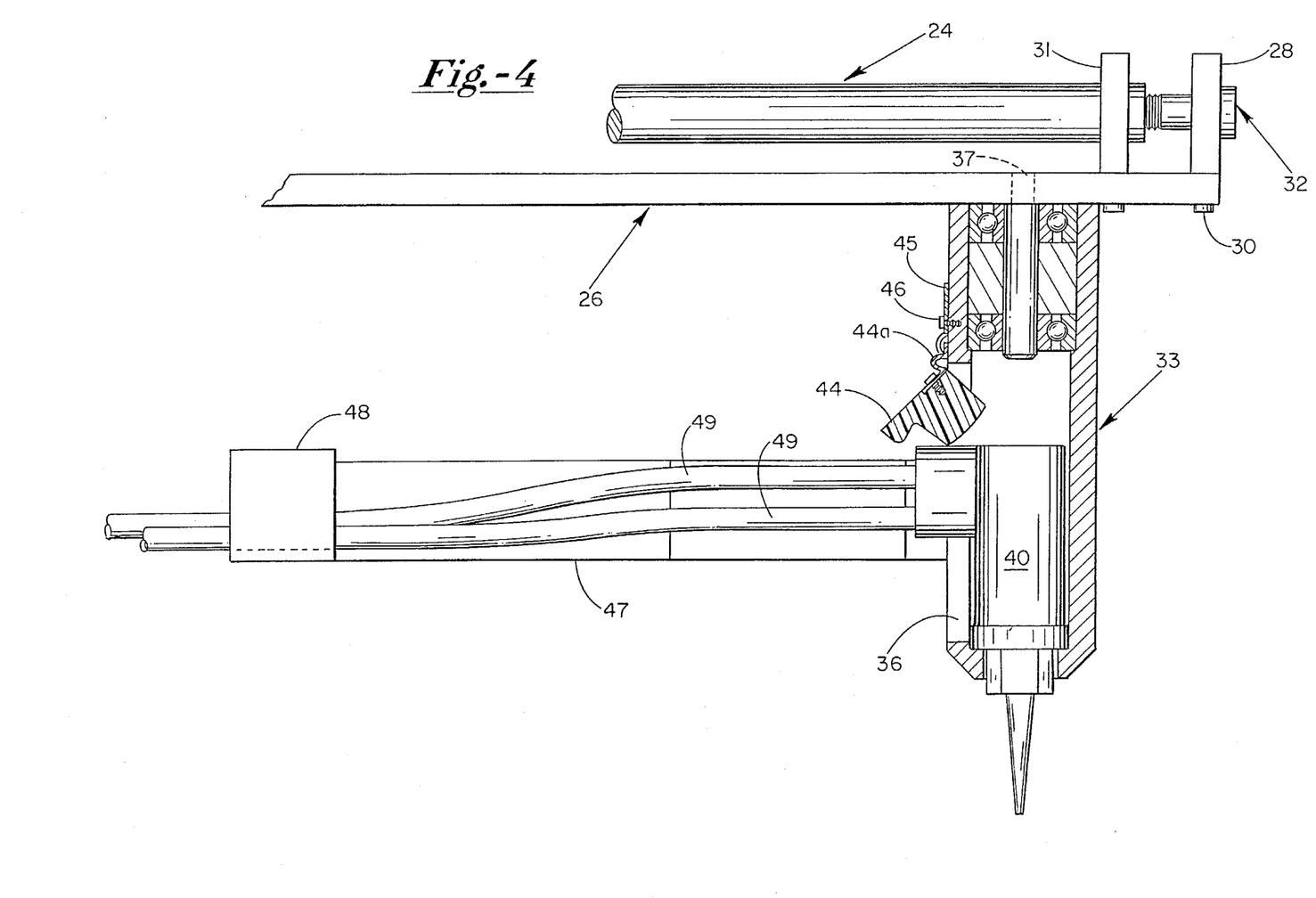
FIG. 4 is a fragmentary side view of the torch holder of my invention taken along line 4—4 of FIG. 1, with the torch holder shown in section and the torch locked in cutting position and shown in elevation.
Figure 5:
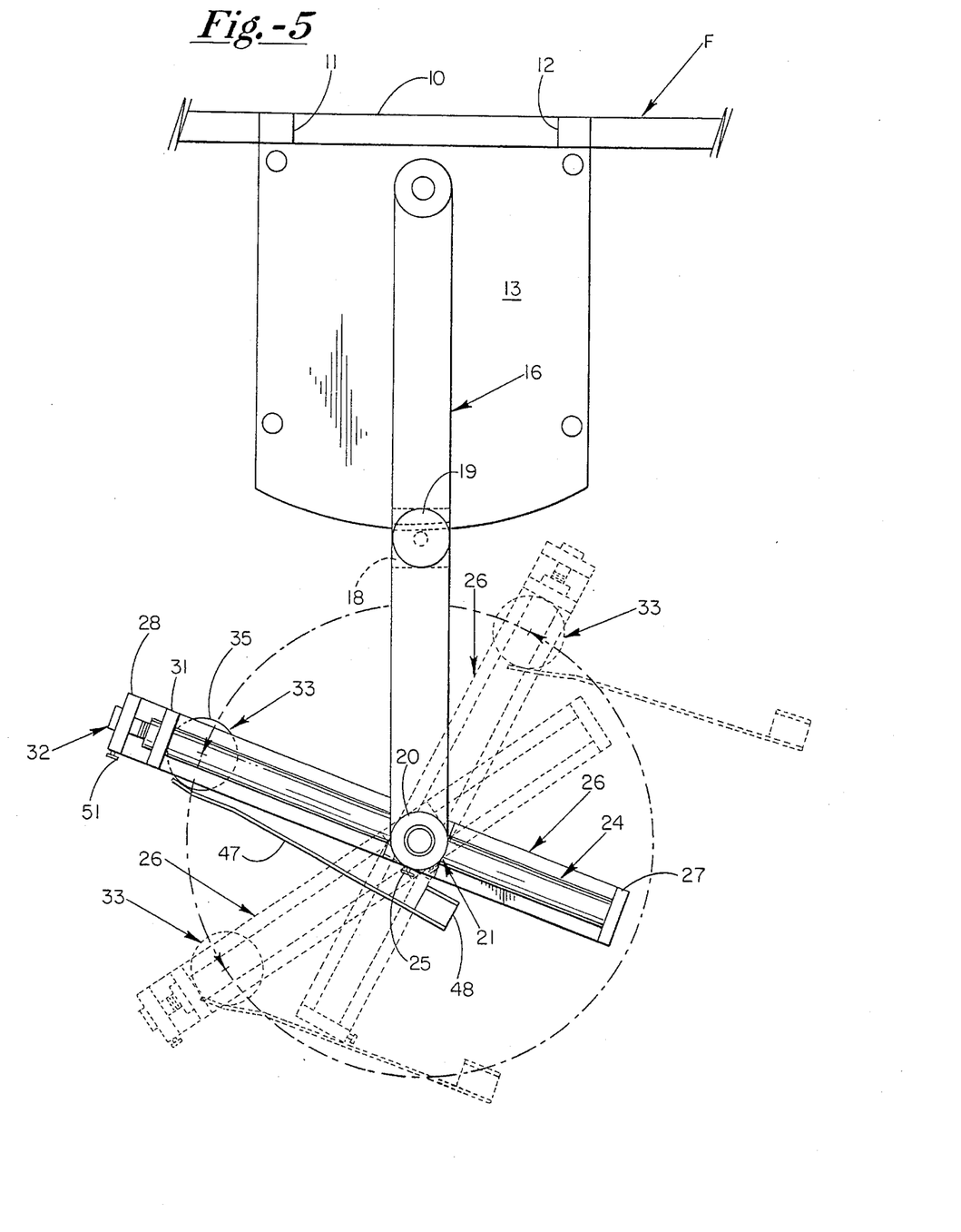
FIG. 5 is a top plan view of my above invention, with various positions of the sliding beam support and torch holder during the cutting operation, shown in broken lines.

The lower end of the tubular member 35 is open, as shown in FIG. 3, and has an inwardly extending shoulder 38 which serves to support either the center-finder 39 or a circle cutting torch 40, as shown in FIG. 4. The center-finder 39 is made of suitable plastic and has a reduced lower end portion 41 and a central bore which accommodates a metal rod 42, the lower end of which is beveled to a sharp central point 43. The center-finder 39 can be inserted through the window 36 and, of course, removed in the same manner.

Pivotally mounted on the side of the upper end portion of the torch holder 33 is a torch lock 44. This member has a metal over-dead-center strip 44a extending laterally therefrom and through an opening provided therefor in a concave pressure-applying plate 45 which, as shown in FIG. 3, is secured to the torch holder by a screw 46. Thus, when the lock 43 is in the dead-center position shown in FIG. 3, it is held in that position by the pressure plate 45 and, as the lock is swung downwardly, beyond the horizontal dead-center position, it snaps into depending locking position shown in FIG. 4. In that position, it engages the top portion of the torch 40 to hold the same snugly in alignment with the vertical axis of the torch holder 33, which is parallel to the vertical axis of the pivot block 21.

Mounted on the exterior surface of the torch holder 33 is a handle member 47 which supports a fuel line holder 48. The latter supports the fuel lines 49 of the torch 40, when the torch is disposed within the torch holder 33, and throughout the cutting action. The handle 47 is of great assistance in guiding the torch holder 33 throughout its 360° arc of travel, and in holding the fuel lines 49 in an out-of-way position throughout said travel.

As shown, the handle 47 is a strip of metal and the fuel-line holder 48 is an L-shaped metal member welded to the lower edge of the outer end thereof.

In use, the entire frame F and the cutting device attached thereto is set upon the upper surface of the plate of metal to be cut or, in the alternative, the sheet metal plate may be placed to rest upon the legs of the base 10. In the former, the legs of the U-shaped base 10 can be utilized to hold the sheet of metal in a fixed position relative to the cutting device. The knob 19 is then loosened to swing the support arm 16 to whatever position is desired, preferably one approximately midway between the side edges of the panel 13 so as to provide the best balance. After the knob 19 has been thereafter tightened to secure the support arm 16 in the desired position, the center-finder 39 is inserted in the window 36 of the torch holder 33. The thumb screw 25 is then released and the mounting base, comprised of the sliding beam 24 and bar 26, is moved horizontally relative to the pivot block 21 until the upstanding support 31 bears against the adjacent side of the pivot block 21. This brings the vertical axis of the torch holder 33 into alignment with the vertical axis of the pivot block 21.

Thereafter, the workpiece W on the frame F is moved so that the center of the desired circle is disposed immediately below the low pointed end 43 of the center-finder. The center of the circle to be cut is either marked previously with a center-punch, or it is applied to the upper surface of the workpiece with a pencil-mark or similar removable mark. If the workpiece is not large, it will fit between the opposing legs 10 of the base of the frame F. If it is too large, it can be placed on top of the two legs 10 and moved until the center of the circle to be cut is directly below the centering point 43. By so doing, the center-point is incorporated into my circle-cutter.

Once the center-point has been located, as described, all that is necessary is that the sliding beam 24 be moved horizontally through the pivot block 21 until the numeral on the scale 34, which represents the radius of the circle to be cut, is directly opposite the vertical axis of the pivot block 21. Thumb screw 25 is then tightened, the center-finder is replaced with the cutting torch 40, the cutting torch is locked in position with lock 44, and the cutting device is ready to cut the opening in the workpiece. The height of the cutting torch is then adjusted by turning the knob 20 in the appropriate direction, after loosening the lock nut 50. Once the height of the torch has been adjusted to the desired elevation relative to the workpiece, the lock nut 50 is tightened to lock the cutting torch at that elevation. The cutting torch is then lighted and the operator seizes the handle 47 and guides the cutting torch throughout its 360° line of travel about the axis of the cutting torch holder 33. The result will be a circle cut at the prescribed radius, with the operator being enabled to accomplish the cut while standing at a single point of location, and without the need for walking around the cutting device, or getting the fuel lines entangled with other portions of the equipment.

The locking of the torch into position with lock 44 brings the axis of the torch into alignment with the axis of the torch holder 33 and into parallel relation with the axis of pivot block 21. It also insures that, when the beam 24 is rotated 360° about the axis of the pivot member 21, the torch will cut out a circular piece having the desired radius.

In the event the user finds that the hole which he has cut is not of the exact size desired, he has a ready adjustment available. He simply loosens the two Allen-head set screws 27a and 31a to free the sliding beam 24 relative to the supports 27 and 31, respectively. He then loosens thumb screw 51, which frees micro-adjustment member 32. He then turns the latter in the appropriate direction to cause the bar 26, torch holder 33, and supports 27, 28, 31 to be moved longitudinally of beam 24 appropriately, to move the torch holder 33 in the desired direction to increase or decrease the radius, as desired. Thumb screw 51 is thereafter tightened. Thus, a simple and effective means for accomplishing micro-adjustments in the diameter of the circular cut is provided.

In the event that there is a need for a plurality of cut pieces having the same diameter, the circle-cutter described in the immediately preceding paragraph may be utilized to cut as many as desired, without any adjustment. To accomplish this purpose, all that is needed is to shift the workpiece sufficiently relative to the axis of the pivot block 21, after each cut is made, to provide adequate material to perform the cut, and then merely cause the torch 40 to be guided by the handle 47 throughout a 360° line of travel.

In the event a substantial number of circular pieces of various diameters are needed, the user can form a gauge block 52 (see FIG. 1), for each size of width dimensions equal to the distance between the support 31 and the adjacent side of pivot block 21, when the gauge 34 is moved to the appropriate radius. The user can then insert the appropriate gauge block 52 between the support 31 and the adjacent side of the pivot block 21, instead of setting the position of the sliding beam 24, as previously described, to insure that he will always obtain cuts of identical desired diameter, with a minimum of delay.

The advantages of my above circle-cutter are many. First of all, it obviates the need for a scarring mark on the workpiece to locate the center of the circle to be cut. In addition, it avoids losing the center-point if it is desired to make more than one cut of the same radius. It is not limited as to the number of times the user can turn the torch holder about the pivot point. The pivot point is automatically selected and retained within the cutting device, once the axis of pivot of the pivotal block 21 is located immediately directly above the center-point. Thus, it is possible to cut multiple holes of the same diameter at the same setting. This effects a substantial savings in time amounting to approximately 80–90% of a savings in labor.

It should be noted that the height of the cutting torch can be adjusted at any time without losing the center of the circle to be cut. Also, the bearings for the pivot block 21 and the torch holder 33 are sealed and thereby preclude the entrance of grit and the wear which results therefrom. Thus, maintenance requirements are maintained at a minimum. As described above, means is provided for micro-adjusting the position of the beam 24 relative to the mounting bar 26. If desired, a motor assembly can be mounted to provide automatic turning. It will be seen that a torch can be installed in the torch holder with a minimum of effort and a maximum of accuracy in the cutting operation.

One of the big advantages of my circle-cutter is that a user can cut an entire circle while standing at a single location. This is in sharp contrast to earlier devices which require that the user walk around the cutting equipment in order to complete the cut and to move the accessories, particularly the fuel lines, for the torch therewith. Another advantage is that there is substantially less wasted material when utilizing my circle-cutter. Thus, it is particularly valuable for use in custom fabrication and manufacturing. Since it is portable, it can be moved to whatever location is needed for cutting a circular hole at any location in a piece of sheet metal.

In addition to the above, it is readily possible to cut out a circular piece of sheet metal by first cutting out a disc, and then moving the sliding beam to a larger radius, and making a larger cut at that dimension. This will produce such a circular piece without the need for locating a second pivot point. Also, with my circle-cutter, a user can cut a circle at any point on a workpiece, regardless of its planar dimensions or its thickness, or the location of the cut relative to the side edge of the workpiece.

It will, of course, be understood that various changes may be made in the form, details, arrangement and proportions of the parts without departing from the scope of the invention which comprises the matter shown and described herein and set forth in the appended claims.

I claim:

1. A double-pivot circle-cutter comprising, (a) a support arm swingably mounted to extend substantially parallel to and above a work-supporting surface;
   (b) a pivot member pivotally mounted on said support arm for pivotal movement about a vertically extending axis extending through said member;
   (c) a mounting base shiftably mounted upon said pivot member for shifting movement relative to said pivot member in a direction generally normal to the axis of pivot of said pivot member; and
   (d) a cutting-member holder pivotally mounted on said mounting base in depending relation thereto for pivotal movement thereof about an axis extending substantially parallel to the axis of pivot of said pivot member whereby a cutting-member, when held by said cutting-member holder in alignment with the axis of pivot of said cutting-member holder, will make a circular cut in a workpiece positioned immediately adjacent to the cutting-member when said pivot member is pivoted 360° about its axis of pivot, the circular cut having a radius equal to the distance between said two axes while the cut is being made.

2. The double-pivot circle-cutter defined in claim 1, wherein said pivot member is vertically adjustable relative to said support arm.

3. The circle-cutter defined in claim 1, wherein said mounting base is shiftable relative to said pivot member to a position whereat the axis of pivot of said cutting-member holder is aligned coaxially with the axis of pivot of said pivot member.

4. The circle-cutter defined in claim 1, wherein said support arm is swingably mounted for swinging movement in a substantially horizontal plane about a vertical axis.

5. The circle-cutter defined in claim 1, wherein said mounting base includes a sliding beam extending through said pivot member which slides, when in use, transversely of said pivot member.

6. The circle-cutter defined in claim 1, wherein said mounting base is elongated and includes a sliding beam which slides through said pivot member when in use, and said sliding beam is adjustable longitudinally relative to the remainder of said mounting base.

7. The circle-cutter defined in claim 1, and (e) a cutting torch carried by said cutting-member holder and directed coaxially with the axis of pivot of said cutting-member holder,
   (f) said cutting holding member being swingable to a position co-axial with said pivot member.

8. The circle-cutter defined in claim 1, and (e) a fuel-line holder supported by said cutting-member holder in position to support fuel lines extending to a cutting torch when the latter is held by said cutting-member holder.

9. The circle-cutter defined in claim 1, and (e) a handle member carried by said cutting-member holder and extending outwardly therefrom for use in directing said cutting-member holder throughout a 360° path around the axis of pivot of said pivot member.

10. The circle-cutter defined in claim 1, and (e) a handle member carried by said cutting-member holder, and
    (f) a fuel-line holder carried by said handle member in position to support fuel lines extending to a cutting torch when the latter is held by said cutting-member holder.

11. A double-pivot circle-cutter comprising, (a) a support arm swingably mounted to extend substantially parallel to and above a work-supporting surface;

(b) a pivot member pivotally mounted on said support arm for pivotal movement about an axis extending at all times substantially vertically through said support arm;

(c) a mounting base shiftably mounted upon said pivot member for shifting movement relative to said pivot member in a direction generally normal to the axis of pivot of said pivot member;

(d) a cutting-member holder pivotally mounted on said mounting base in depending relation thereto for pivotal movement thereof about an axis extending substantially parallel to the axis of pivot of said pivot member whereby a cutting-member, when held by said cutting-member holder, will make a circular cut in a workpiece positioned immediately adjacent to the cutting-member when said pivot member is pivoted 360° about its axis of pivot, the circular cut having a radius equal to the distance between said two axes while the cut is being made.

12. A double-pivot circle-cutter comprising, (a) a support arm constructed and arranged to be rigidly mounted to extend substantially parallel to and above a work-supporting surface;

(b) a pivot member pivotally mounted on said support arm for pivotal movement about an axis extending substantially vertically;

(c) a mounting base shiftably mounted upon said pivot member for shifting movement relative to said pivot member in a direction generally normal to the axis of pivot of said pivot member;

(d) at least a portion of said mounting base extending through said pivot member and being shiftable there beyond in opposite directions substantially normal to the axis of pivot of said pivot member and (e) a cutting-member holder pivotally mounted on said mounting base in depending relation thereto for pivotal movement thereof about an axis extending substantially parallel to the axis of pivot of said pivot member whereby a cutting-member, when held by said cutting-member holder, will make a circular cut in a workpiece positioned immediately adjacent to the cutting-member when said pivot member is pivoted 360° about its axis of pivot, the circular cut having a radius equal to the distance between said two axes while the cut is being made.

13. A double-pivot circle-cutter comprising, (a) a support arm constructed and arranged to be rigidly mounted to extend substantially parallel to and above a work-supporting surface;

(b) a pivot member pivotally mounted at a fixed location on said support arm for vertical adjustment for pivotal movement about an axis extending substantially vertically;

(c) a mounting base shiftably mounted upon said pivot member for shifting movement relative to said pivot member in a direction generally normal to the axis of pivot of said pivot member; and (d) a cutting-member holder pivotally mounted on said mounting base in depending relation thereto for pivotal movement thereof about an axis extending substantially parallel to the axis of pivot of said pivot member, whereby a cutting-member, when held by said cutting-member holder, will make a circular cut in a workpiece positioned immediately adjacent to the cutting-member, when said pivot member is pivoted 360° about the axis of pivot, the circular cut having a radius equal to the distance between said two axes while the cut is being made.

14. A double-pivot circle-cutter comprising, a. a support arm constructed and arranged to be rigidly mounted to extend substantially parallel to and above a work-supporting surface;

b. a pivot member pivotally mounted on said support arm for pivotal movement about an axis extending at all times substantially vertically through said support arm;

c. a mounting base including a shaft shiftably mounted upon said pivot member for shifting movement relative to said pivot member in a direction generally normal to the axis of pivot of said pivot member; and d. a cutting-member holder carried by said shaft in depending relation at a point fixed with respect to said shaft and being pivotable about an axis parallel to the axis of pivot of said pivot member, whereby a cutting-member, when held by said cutting-member holder, will make a circular cut in a workpiece positioned immediately adjacent to the cutting-member, when said pivot member is pivoted 360° about its axis of pivot, the circular cut having a radius equal to the distance between said two axes while the cut is being made.

15. A double-pivot circle-cutter comprising:

(a) a support arm constructed and arranged to be mounted upon a support to extend parallel to a work-supporting surface;

(b) a pivot member pivotally mounted on said support arm for free pivotal movement about a vertically extending axis, said pivot member being vertically adjustable relative to said support arm;

(c) a shiftable beam carried by said pivot member and being shiftable relative thereto in a generally horizontal direction; and (d) a cutting-member holder carried by said beam and being shiftable therewith and being supported thereby in relatively pivotable relation for pivotal movement thereof about a vertical axis which extends parallel to the axis of pivot of said pivot member.

16. A double-pivot circle-cutter comprising, (a) a rigid support arm constructed and arranged to be pivotably mounted upon a support in parallel relation to a work-supporting surface and in generally horizontal outwardly extending relation to said support;

(b) a pivot member pivotally mounted upon said support arm in depending relation for pivotal movement about a vertically extending axis;

(c) a sliding beam carried by said pivot member and being slidable therethrough in a generally horizontal direction;

(d) a platform carried by said sliding beam; and (e) a cutting-member holder pivotably mounted on said platform in depending relation for pivotal movement of said cutting-member holder about an axis extending parallel to the axis of pivot of said pivot member;

(b) said platform being shiftable with said sliding beam to a zero position whereat the axis of pivotal movement of said cutting-member holder is coaxial with the axis of pivot of said pivot member, and being shiftable away from said position along a straight line to a second position at which the axis of pivot of said cutting-member holder will be disposed away from the axis of pivot of said pivot member a distance equal to the radius of the circle desired to be cut, whereby a cutting torch when held by said cutting-member holder in alignment with the axis of pivot of said cutting-member holder, will cut a circle having a radius equal to the distance between said two axes as said cutting member holder and said beam are moved 360° around the axis of pivot of said pivot member.

17. A double-pivot circle-cutter comprising:

(a) a support arm constricted and arranged to be mounted upon a support to extend parallel to a work-supporting surface;

(b) a pivot member pivotally mounted on said support arm for free pivotal movement about a vertically extending axis;

(c) a shiftable beam carried by said pivot member and being shiftable therethrough in a generally horizontal direction; and (d) a cutting-member holder carried by said beam and being shiftable therewith and being supported thereby in relatively pivotable relation for pivotal movement thereof about a vertical axis which extends parallel to the axis of pivot of said pivot member, (e) said beam being shiftable relative to said pivot member to a position at which the axis of pivot of said cutting-member holder is aligned substantially coaxially with the axis of pivot of said pivot member.

18. A double pivot circle cutter comprising:

(a) a support arm constructed and arranged to extend substantially parallel to and above a work-supporting surface;

(b) a pivot member pivotally mounted on said support arm for pivotal movement about a vertically extending axis;

(c) a mounting base shiftably mounted upon said pivot member for shifting movement relative to said pivot member in a direction generally normal to the axis of pivot of said pivot member;

(d) a cutting-member holder pivotably mounted on said mounting base in depending relation thereto for pivotal movement thereon about an axis extending substantially parallel to the axis of pivot of said pivot member whereby a cutting member, when held by said cutting-member holder in alignment with the axis of pivot of said cutting-member holder, will make a circular cut in a workpiece positioned immediately adjacent to the cutting member when said pivot member is pivoted 360° about its axis of pivot, the circular cut having a radius equal to the distance between said two axes, while the cut is being made; and (e) said pivot member being vertically adjustable relative to said support arm.

* * * * *

UNITED STATES PATENT AND TRADEMARK OFFICE
CERTIFICATE OF CORRECTION

PATENT NO.  : 5,575,971
DATED       : November 19, 1996
INVENTOR(S) : Jerry L. Bond It is certified that error appears in the above-identified patent and that said Letters Patent is hereby corrected as shown below:

Column 9, line 53, insert "and" after "vertical adjustment".

Column 11, line 9, "constricted" should be --constructed--.

Signed and Sealed this

Fourth Day of March, 1997

Attest:

BRUCE LEHMAN

*Attesting Officer*   Commissioner of Patents and Trademarks